United States Patent
Nebbia et al.

(10) Patent No.: US 7,808,372 B2
(45) Date of Patent: Oct. 5, 2010

(54) DETECTION DEVICE FOR VEHICLES

(75) Inventors: Fabio Nebbia, Casale Monferrato (IT);
Paolo Colombo, Casale Monferrato (IT)

(73) Assignee: ELTEK S.p.A., Casale Monferrato (Alessandria) (IT)

( * ) Notice: Subject to any disclaimer, the term of this patent is extended or adjusted under 35 U.S.C. 154(b) by 316 days.

(21) Appl. No.: 12/032,047

(22) Filed: Feb. 15, 2008

(65) Prior Publication Data
US 2008/0196495 A1 Aug. 21, 2008

(30) Foreign Application Priority Data
Feb. 15, 2007 (IT) ................ TO2007A0113

(51) Int. Cl.
*B60G 1/00* (2006.01)
(52) U.S. Cl. ............... 340/438; 340/450.2; 340/426.25
(58) Field of Classification Search ............ 340/438, 340/439, 449, 450, 450.2, 451, 603, 609, 340/612, 870.02, 426.25; 123/1 A, 3, 575
See application file for complete search history.

(56) References Cited

U.S. PATENT DOCUMENTS

| | | | |
|---|---|---|---|
| 6,508,235 B2* | 1/2003 | Fabre | 123/520 |
| 7,005,975 B2* | 2/2006 | Lehner | 340/438 |
| 7,049,975 B2* | 5/2006 | Vanderah et al. | 340/870.02 |
| 7,272,485 B2* | 9/2007 | Amano et al. | 701/104 |
| 2003/0102976 A1 | 6/2003 | Lavallee | |

FOREIGN PATENT DOCUMENTS

GB 2343283 A 5/2000
WO WO 2004/047330 A3 6/2003

\* cited by examiner

*Primary Examiner*—Van T. Trieu
(74) *Attorney, Agent, or Firm*—Heslin Rothenberg Farley & Mesiti P.C.; Victor A. Cardona

(57) ABSTRACT

An antifraud device for a vehicle has a tank with a filler provided with a removable cap. The device comprises a first sensor, for detecting a movement of the cap with respect to the filler, and second sensor, configured for detecting at least one of the level and a qualitative characteristic of the contents of the tank. A control unit generates first information being indicative of detections made by the first sensor, and second information being indicative of detections made by the second sensor, and stores the information in a correlated form. The device is further arranged for making explicit the first information and the second information in a correlated form, in order to identify one or more of the following conditions: removal of at least part of the contents of the tank; dilution or alteration of the contents of the tank; replacement of at least part of the contents of the tank; effective removal of the cap following upon a movement thereof in the filler.

20 Claims, 4 Drawing Sheets

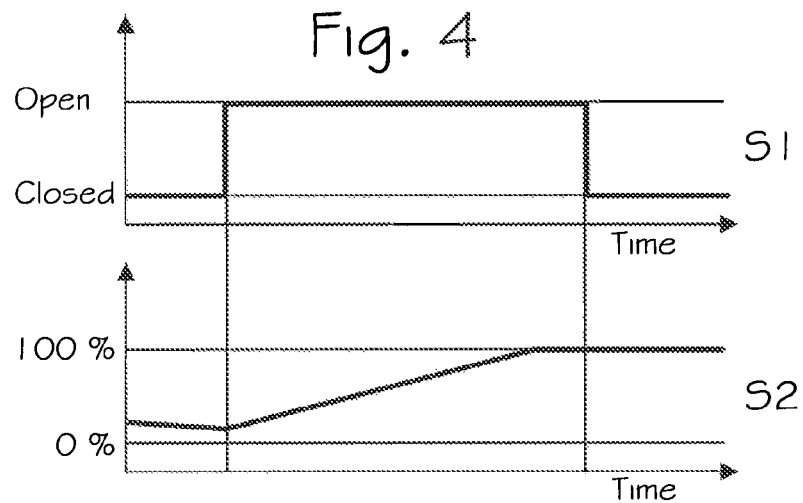
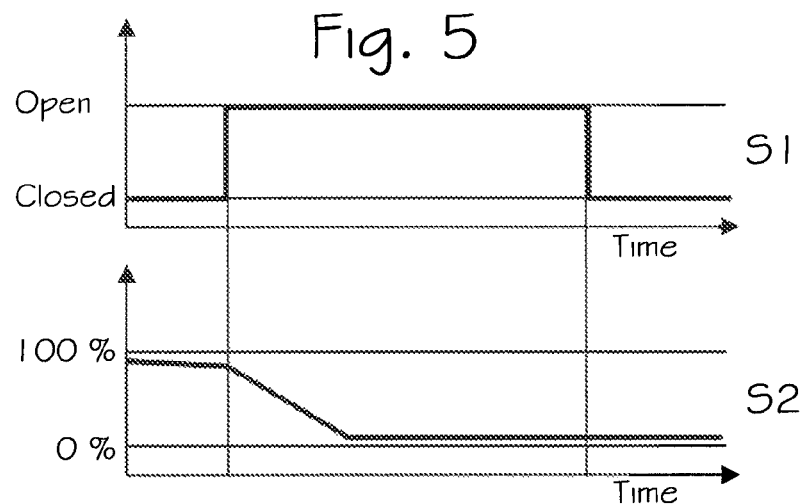
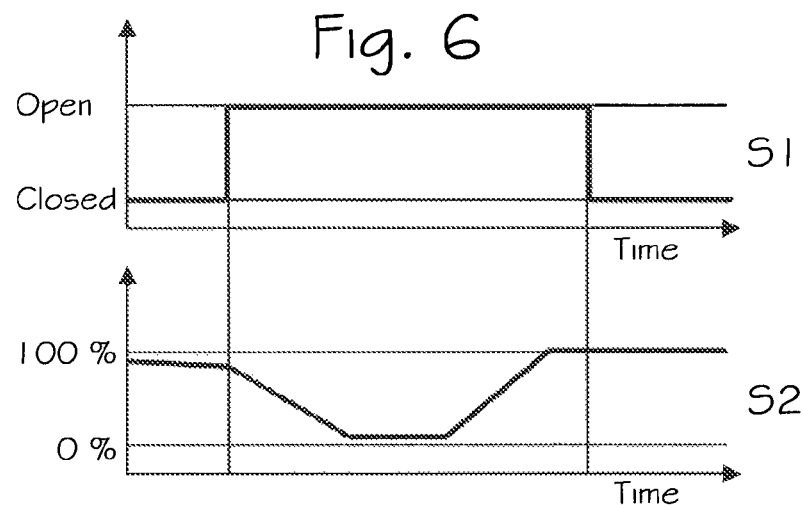

DETECTION DEVICE FOR VEHICLES

CROSS-REFERENCE TO RELATED APPLICATIONS

This application claims priority from Italian patent application No. TO2007A000113, filed on Feb. 15, 2007, the entire disclosure of which is incorporated herein by reference.

FIELD OF THE INVENTION

The present invention relates to a detection device for vehicles, and in particular to an antifraud device for a vehicle having at least one tank.

BACKGROUND ART

In order to prevent fuel being stolen from a vehicle key-operated caps have been proposed. A cap of this type basically comprises a gripping portion, facing the outside of the filler of the tank, and a locking or clamping portion, having first coupling means, which are adapted to co-operate with second coupling means provided at the filler of the tank. The coupling means referred to above are usually of a threaded or bayonet-coupling type.

The cap then comprises a locking device, which can be switched between a closing condition and an opening condition and comprises a rotor with a seat for a respective key. The device is operatively set between the gripping portion and the locking portion of the cap in such a way that, in the closing condition, a rotation movement imparted manually upon the gripping portion does not enable disengagement of the locking portion from the corresponding seat. Instead, in the opening condition of the mechanism, the aforesaid rotation movement enables disengagement of the clamping portion from its seat.

Key-operated caps are effective in the case of vehicles for private use, but are not completely suitable for preventing fraudulent removal of fuel from a vehicle to which a plurality of authorized persons have access. An example is the case of haulage companies, car-rental firms, and, more in general, all those organizations that have available vehicles that are normally used by different people. In these cases an authorized driver, or at least the person who has the keys of the vehicle at his disposal, can easily open the tank and fraudulently remove therefrom part of the contents. An example of fraud understood in this sense is the case in which the fuel that has been removed is replaced with another liquid, for example water. Problems of this sort are encountered in the case of tanks for additives, typically provided on certain types of vehicles such as lorries and buses.

Systems have been proposed for detecting opening of the cap of the tank of a vehicle, which are typically pre-arranged for detecting rotation of the cap and generating an alarm signal.

For example, GB-A-2343283 describes a remote detection system of this type. In this solution, the movement of the cap is detected by a sensor, and a transmitter circuit consequently sends an alarm signal to a control unit. In solutions of the type referred to above, the detection system can be incorporated in the cap. As mentioned previously, in key-operated caps the locking mechanism is designed in such a way that, when the mechanism itself is in the closing condition, the gripping portion is free to rotate even though this does not enable removal of the cap from the filler of the tank and hence removal of fuel: this fact may be the source of false alarms. For instance, if the vehicle is parked and somebody, for any reason, turns the cap, the system generates an alarm signal, even though in actual fact the cap has not been removed from the filler of the tank and no fraudulent action or removal of fuel is in progress.

In other known solutions the detection system comprises, instead, a sensor mounted at the filler. An arrangement of this type is described, for example, in WO03/047330, where associated to the cap is a magnet and associated to the filler of the tank is a magnetic sensor.

Solutions of this second known type can enable detection of an attempt at opening or the effective opening condition of the cap, but are not useful for ascertaining whether said opening is in actual fact followed by a fraudulent action or otherwise.

SUMMARY OF THE INVENTION

The aim of the present invention is principally to solve the drawbacks mentioned above in a simple, reliable, and inexpensive way. A further aim of the present invention is to provide a detection device which is able to generate coded information representing any removal and/or manipulation or alteration of the contents of the tank of a vehicle in order to identify and discourage said type of fraudulent activity.

The above aims are achieved, according to the invention, by an antifraud device for tanks of vehicles, which presents the characteristics indicated in the annexed claims. The claims form an integral part of the technical teaching provided herein in relation to the invention.

BRIEF DESCRIPTION OF THE DRAWINGS

Further purposes, characteristics and advantages of the present invention will emerge clearly from the ensuing detailed description and from the annexed plates of drawings, which are provided purely by way of explanatory and non-limiting example, and in which:

FIGS. 4 to 8 are schematic representations of examples of operations of detection that can be performed using the antifraud device according to the invention.

DETAILED DESCRIPTION OF PREFERRED EMBODIMENTS OF THE INVENTION

Figure 1:
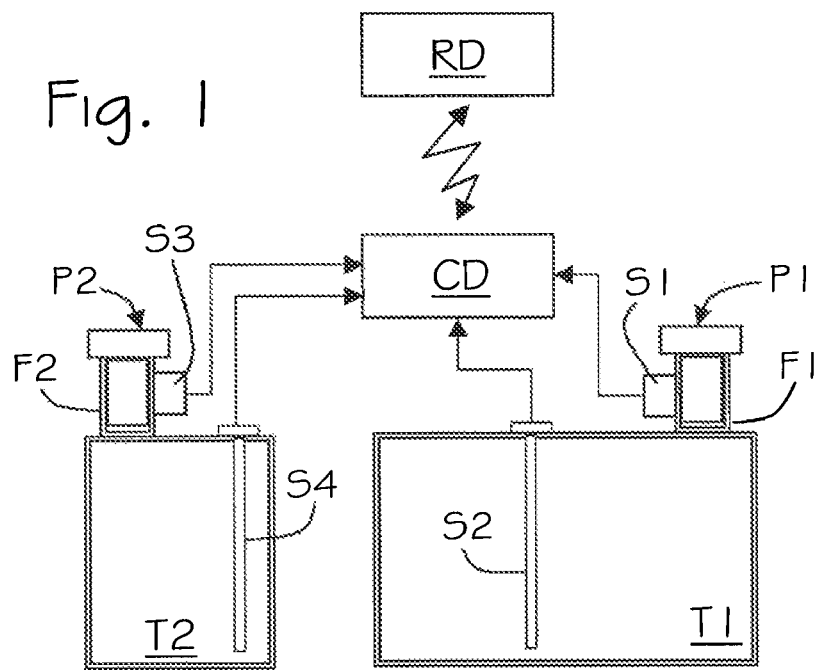
FIG. 1 is a schematic representation of an antifraud device according to the invention.

In FIG. 1, designated by T1 is a fuel tank of a generic vehicle, which is assumed here as being a lorry with diesel engine. The tank T1 has a filler F1 for filling with diesel fuel, which defines a seat for a corresponding cap P1. Designated by S1 is a sensor device, designed to detect conditions of state of the cap P1, such as its possible movements or removal (or presence/absence) at the filler F1.

The sensor device S1 can be of any known type, for example, comprising a magnetic element carried by the cap P1 and a magnetic detector (for example, of a reed type or a Hall-effect type) mounted in correspondence of the filler F1, or else of the type comprising an electromechanical detector (for example, comprising a microswitch), which detects the physical presence or absence of the cap in the filler. Alternatively, the sensor could be completely integrated or incorporated in the cap and connected, for example by means of a telemetry system or a wireless-connection system, to an external detection unit.

The tank T1 is further provided with a level sensor S2, which is also of a type in itself known. The sensor S2 can, for example, be the one which is normally provided for supplying visual information to the driver, by means of an indicator present on the dashboard of the vehicle, as regards the residual amount of fuel present in the tank T1. The sensor S2 can alternatively be a dedicated sensor device or a sensor device specific for the purposes of the invention.

Designated by CD is a control or monitoring unit, mounted on the vehicle, to which the sensors S1 and S2 are connected. In the example considered here, the unit CD is configured as a dedicated device, but there is nothing to rule out integration of its functions in an electronic control unit of one or more further sub-systems of the lorry, for example an engine control unit.

The sensor S1 can be directly connected to the unit CD, by means of appropriate interface means and/or means of conversion of the signal generated, either through conductor cables or through wireless transmission means. Also the sensor S2 can be in direct signal communication, either wired or wireless, with the unit DC. On the other hand, in the case where the sensor S2 is the one already normally provided in the tank T1, the data on the level can be obtained from the unit CD through the mediation of another electrical/electronic system of the vehicle, for example the one that handles the warnings on the corresponding dashboard.

In the example illustrated, the vehicle comprises a second tank, designated by T2, for example, designed to contain an ammoniac-based or urea-based additive or reagent, necessary for operation of a system for reducing the emissions of nitrogen oxides ($NO_x$). An additive of this type is, for example, the one commercially known as AdBlue.

Also the tank T2 is provided with a respective filler F2, equipped with a cap P2. Designated by S3 is a sensor device designed to detect conditions of state of the cap P2, such as its possible movements or removal (or presence/absence) in a region corresponding to the respective filler F2. Also the sensor device S3 can be of any known type, as mentioned above as regards the sensor S1.

The tank T2 is further provided with means for detecting one or more quantitative characteristics (level) and/or qualitative characteristics (chemical and/or physical characteristics) of the additive. For simplicity, it is assumed that said detector means are represented by a sensor S4 for detecting the concentration of the solution contained in the tank T2. Take for example a typical case of fraud in which the additive (or fuel) is removed from the corresponding tank and is replaced with another low-cost liquid, for example water. In a way similar to the sensors S1 and S2, also the sensor S4 is connected, in a direct or indirect way, to the unit CD.

It is to be considered in any case that the aforesaid detector means could comprise a plurality of sensors specific for detection of a plurality of parameters, including the level of the additive.

The detection device according to the invention is arranged in such a way that the data detected by means of the sensors S1-S4 are gathered by the unit CD, in order to generate coded information that is subsequently communicated to a remote supervision unit, for example located at the premises of the haulage firm or in garage of the vehicle. In particular, as will emerge hereinafter, the unit designated by RD in FIG. 1 is used for querying periodically, with a frequency that can be either regular or variable, the unit CD set on board the vehicle, in order to control, for example, the correctness of the declarations supplied by the authorized driver as regards filling with diesel fuel and/or additive.

Figure 2:
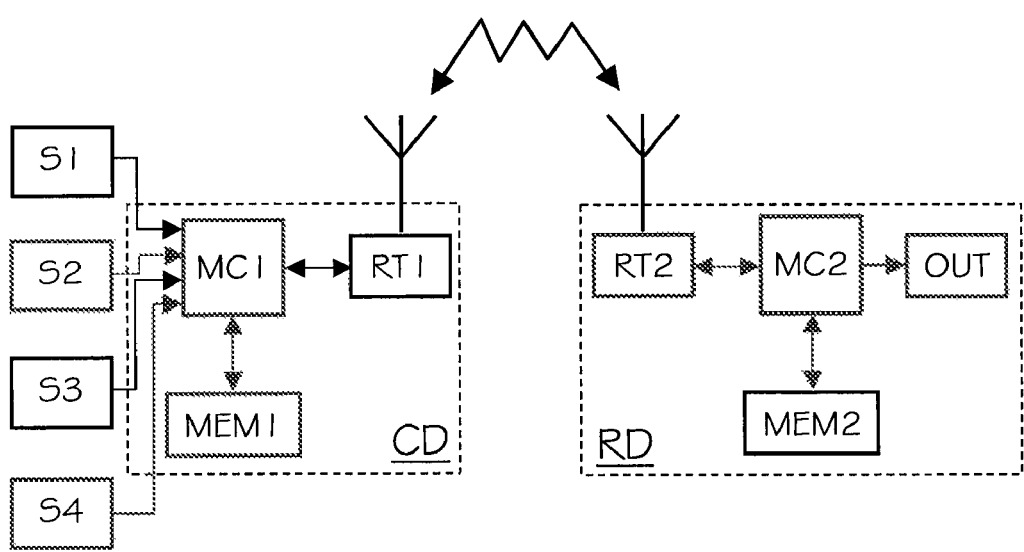
FIG. 2 is a simplified block diagram that illustrated a possible embodiment of two units of the antifraud device according to the invention.

FIG. 2 is a schematic representation of the general configuration of the antifraud device according to the invention.

The unit CD comprises a microcontroller MC1, pre-arranged for receiving from the sensors S1-S4 the respective signals. The microcontroller MC1 is further programmed for generating, as a function of said signals, coded information that represents movement or removal or opening of the cap P1 and/or of the cap P2, the level of the diesel fuel in the tank T1, and the quality of the additive in the tank T2. As has been mentioned, the system can further comprise specific sensor means (not represented for simplicity) for detecting any possible parameters regarding the fuel and/or the additive. In the preferred embodiment, the unit CD moreover comprises a nonvolatile memory MEM1, operatively connected to the microcontroller MC1, for storing the aforesaid coded information.

In the embodiment currently deemed preferential, the unit CD is configured so as to provide a clock functionality, i.e., a time-counting functionality, as is currently available practically in all low-cost microprocessors. In the example given, said function is provided by the microcontroller MC1. Thanks to said characteristic, the control unit CU can implement a clock and/or calendar function, with the microcontroller MC1 that is programmed for storing the date and/or time of conditions of state of the cap P1 and/or of the cap P2 (for example, possible movements or removal or opening), which can be detected by means of the corresponding sensor S1 or S3, in the ways described above. Basically, the microcontroller MC1 processes the signals received from the sensor S1 and/or the sensor S3 and converts them into information of a temporal nature (date and/or time), which is stored in the memory MEM1. Preferably, the microcontroller MC1 is moreover programmed for acquiring signals from the sensors S2 and S4 and storing them in the form of coded information, in correlation with a datum of a temporal nature (date and/or time). As will emerge clearly hereinafter, the microcontroller MC1 is preferably also pre-arranged for associating or correlating to one another any detections made by means of different sensor means, such as, for example, the sensors S1 and S2, as well as the sensors S3 and S4.

The unit CD further comprises means for making explicit, or transmitting, or allowing reading of the information stored in its memory means. In a possible embodiment, the reading means comprise a data transceiver operating in wireless mode, in particular radio-frequency of RF mode, of a conception in itself known and designated by RT1 in FIG. 2. Transmission of the information or data present in the memory MEM1 is, for example, controlled by the microcontroller MC1, following upon a request received from the outside, i.e., from the supervision unit RD. The latter is preferably provided with a microcontroller MC2 operatively connected to a data-communication interface RT2, with a communication technique and protocol compatible with those of the transceiver RT1 of the unit CD. The unit CD is supplied through a suitable supply source, represented by one or more dedicated batteries or else by a battery of the vehicle.

Figure 3:
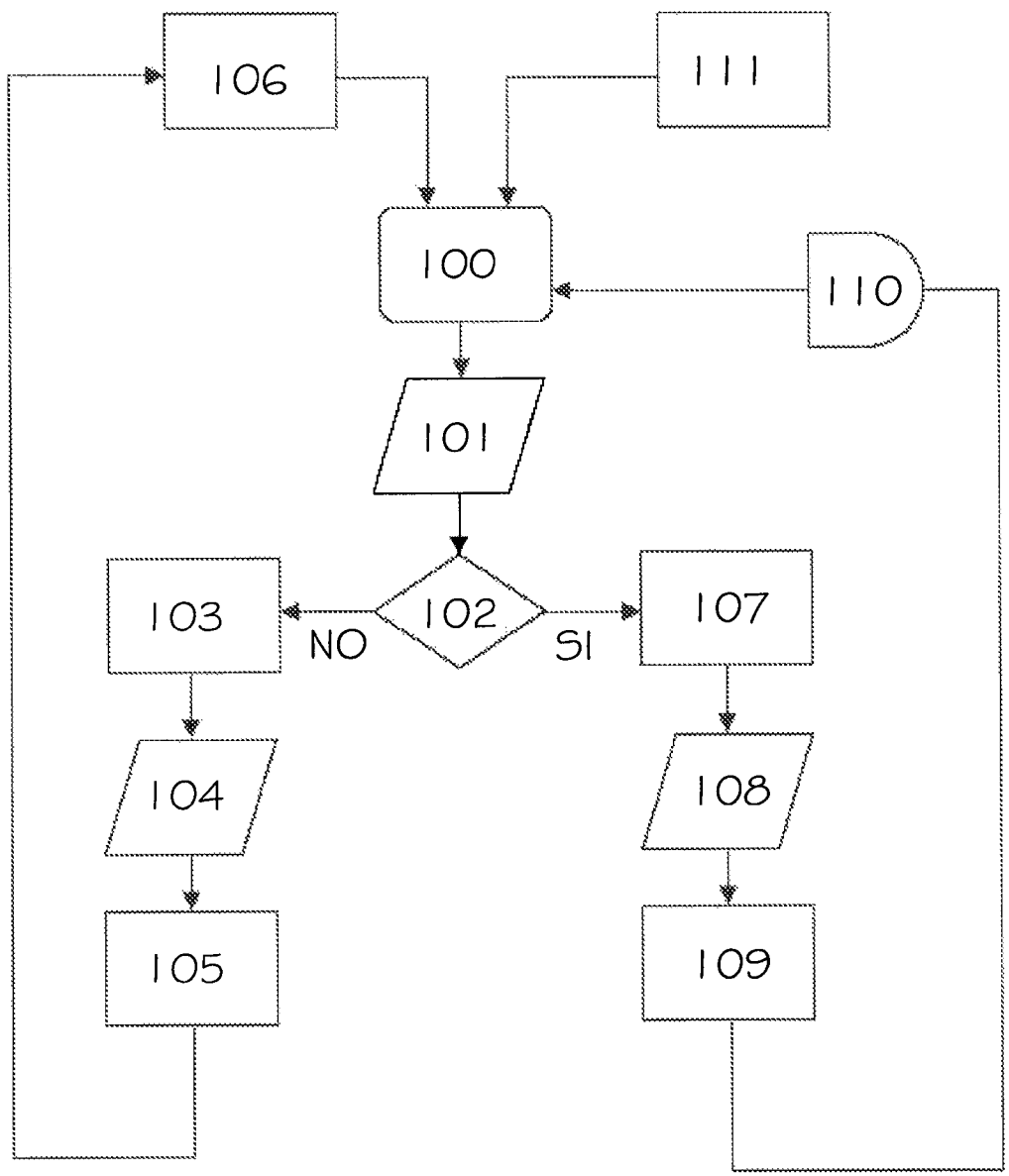
FIG. 3 is a simplified block diagram of a possible control logic of an antifraud device according to the invention.

A possible logic of operation of the unit CD is illustrated in the form of flowchart in FIG. 3.

The reference number 100 designates the starting block of the program, following upon which control passes on to block 101, in which reading of the state of the cap P1 and/or the cap P2 is performed by the corresponding sensor S1 or S3. The next block 102 is a test block: in the case where the cap is closed (output NO), control passes on to block 103, in which in the memory MEM1 the condition of cap closed and the corresponding date/time are stored. Control then passes to block 104, for reading of the state of the sensor S2 and/or the sensor S4, and then to block 105, for storage of the measurement of level and/or quality made with said sensor S2 and/or S4 and of the date/time of detection. Control then passes to block 106, which defines the time frequency with which the program is repeated (for example once a minute).

To return to the test block 102, in the case where the cap is opened (output YES), control passes to block 107, through which the opening condition of the cap P1 and/or the cap P2 and the corresponding date/time are stored in the memory MEM1. Control then passes to block 108, for reading of the state of the sensor S2 and/or the sensor S4, and then to block 109, for storage of the measurement of level and/or quality carried out by means of said sensor S2 and/or S4 and of the date/time of detection. Control then passes to block 110, through which the reading loop with cap open is repeated at a higher frequency (for example, one loop every 2 seconds) with respect to the one provided for by block 106. Block 111 finally represents a block that generates an interrupt for immediate starting of the program, in the case where the sensor S1 or the sensor S3 generates a capopen signal.

The data read and stored by means of the device CD are subsequently unloaded from the memory MEM1 and processed through the reading device RD, so as to be then made explicit in a correlated form and thus supply indications regarding the evolution of the level of the fuel and/or the quality of the additive. It will be appreciated, for example, that detection of a practically constant level, or a slowly decreasing level, in the presence of cap closed can be considered as representing a lorry that is stationary or one that is travelling. A fast and significant reduction in the level of the fuel with the cap closed is, instead, to be considered as indicative of a removal of fuel downstream of the filler or of the tank. The aforesaid significant reduction in level can be represented by a value that is higher than values of reduction pre-defined as reference limit; for example, said values may be defined and/or programmed as desired in the device according to the invention, on the basis of typical detections of levels of consumption of the vehicle during normal use. On the other hand, the detection of an increase in level in the presence of cap open can be considered as representing a filling in progress, whilst detection of a reduction in level in the presence of cap open, in particular if it occurs rapidly, is evidently indicative of a removal of fuel.

FIGS. 4-8 illustrate typical situations that may be detected through the device forming the subject of the invention, in relation to at least one of the means for detection of qualitative and/or quantitative characteristics of the contents of the tank, such as, for example, the fuel-level sensor, and to the state of at least one of the sensors of the cap. The diagram at the top in each of said figures represents the state of the cap P1, whilst the diagram at the bottom represents the type of detection made by the sensor S2.

FIG. 4 illustrates the case of a period of opening of the cap P1, in concomitance with which an increase of level of the liquid present in the fuel tank occurs. The situation, as has been said, is indicative of a refuelling.

FIG. 5 illustrates the case of a period of opening of the cap P1, in concomitance with which a reduction in level of the liquid present in the fuel tank occurs. This situation is indicative of a removal of fuel through the filler of the fuel tank.

FIG. 6 illustrates the case of a period of opening of the cap P1, in concomitance with which there occurs firstly a reduction and then an increase in the level of the liquid in the fuel tank. This situation is indicative of a removal of fuel and a replacement of the fuel removed with some other liquid.

Figure 7:
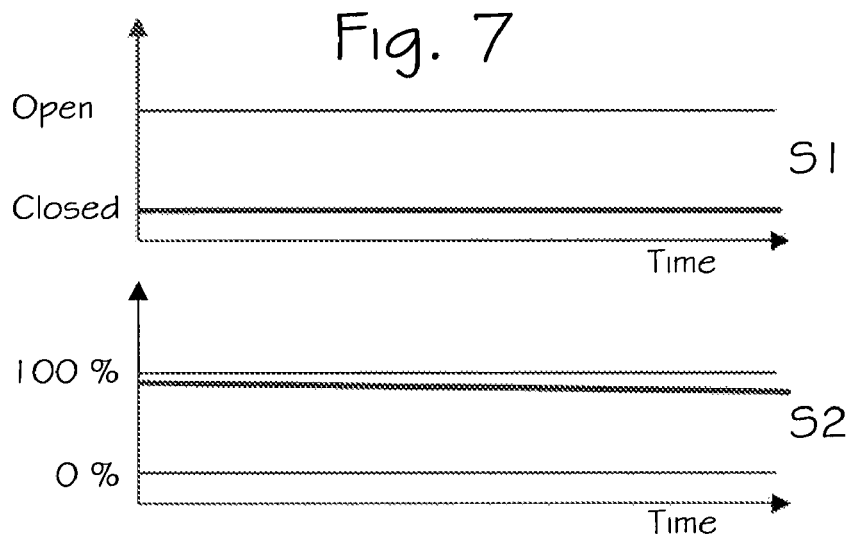

FIG. 7 illustrates the case of a slow reduction in the level of the fuel, or not significant over the short term, whilst the cap P1 is closed. This situation is indicative of normal fuel consumption in the course of use of the vehicle.

Figure 8:
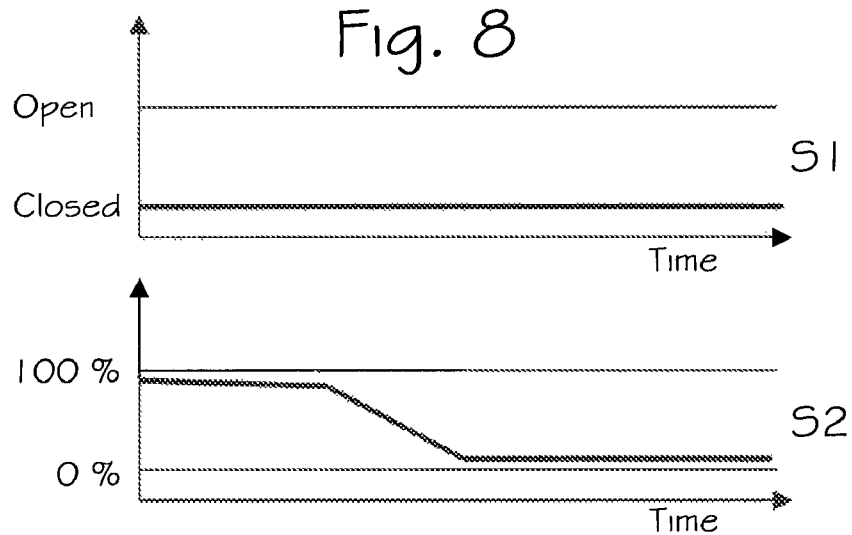

FIG. 8 illustrates, instead, the case of a fast reduction in the level of the fuel, significant over the short term, whilst the cap P1 is closed. This situation is indicative of a removal of fuel from an extraction point being downstream of the filler of the fuel tank, i.e., a point different from that of the filler, such as, for example, the line for delivery of the fuel to the vehicle engine, or else a vent of the fuel tank, or another opening or duct suitable for allowing removal of the fuel.

The aforesaid short term may correspond to a value lower than a pre-defined time value of typical reduction of the fuel, for example, a value that can be pre-defined and/or programmed as desired in the device according to the invention, on the basis of typical detections of reduction in level during normal use (for example, corresponding to a reduction of at least 1% in the tank level over a time shorter than 1 minute).

It should be noted that the type of detections described with reference to FIGS. 4-8 can be obtained also in the case of the tank T2, when its detection means S4 are represented by or comprise a level sensor. It is likewise evident that the same logic can be used with reference to qualitative characteristics of the liquid contained in the tank of interest, when this is provided with specific sensors of this sort.

The diagram represented in FIG. 3 illustrates a control logic that can be used in the case where the sensor S1 and/or the sensor S3 are of the type designed to detect effective opening and closing of the corresponding cap. The invention can in any case be implemented also in the case of caps that integrate a corresponding movement or rotation sensor, with modalities that are clear to the person skilled in the art. Such a case is exemplified in FIG. 9, where the same reference numbers as the ones used in FIG. 1 are used to designate elements that are technically equivalent to the ones described previously.

Figure 9:
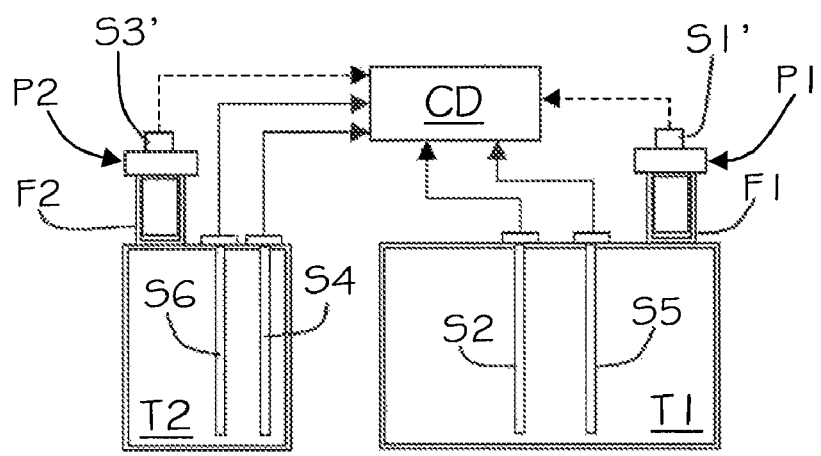
FIG. 9 is a schematic representation of a variant of the antifraud device according to the invention.

In FIG. 9, designated by S1' and S3' are two movement sensors integrated in the respective caps P1 and P2, connected to the unit CD in wireless mode, for example, by means of RF data transmission. The components of the unit CD are basically the same as the ones represented in FIG. 2, with the difference that in this embodiment at least the sensors S1' and S3' communicate, by means of respective transmission means, with the transceiver RT1, and the tanks T1 and T2 are equipped also with a quality sensor S5 and a level sensor S6, respectively. In a way similar to the sensors S1' and S3', also the various further sensors, such as the sensors S2, S4, S5 and S6, can be connected to the unit CD in wireless mode, for example by means of RF data transmission.

A control logic that can be used in the case of the sensors S1' and S3' is described in what follows.

In normal use, if the cap P1 or the cap P2 is rotated or opened, the corresponding sensor S1' or S3' generates a signal, which is received by the microcontroller MC1. Upon reception of said signal, the microcontroller MC1 stores a corresponding temporal information (date and/or time) in a first location of a first memory address, detects the value of the level of the fuel or of the additive by means of the sensor S2 or S6, and stores the corresponding information in a second location of the first register of the memory MEM1. Simultaneously, the microcontroller MC1 starts a time-out or counting of the time (for example, 30 minutes) during which it carries out cyclically (for example, every 2 seconds) a control of the level of the fuel in the tank T1 or of the additive in the tank T2, once again by means of the corresponding sensor S2 or S6, cyclically storing the value detected in a third location of the first memory register.

If the value measured in the course of the time-out does not undergo variations, the microcontroller MC1 deduces that the movement of the cap P1 or the cap P2 has been "accidental", and if necessary stores in an appropriate form, in a location of the memory register, corresponding information, without carrying out any further processing operations. Instead, in the case where the value varies, the microcontroller MC1 deduces that a filling or a removal of fuel or of additive is in progress; for example, in the case of filling, the value of level detected increases, whilst in the case of removal the value of level decreases.

In both cases, a subsequent signal coming from the sensor S1' or S3' during the time-out is appropriately detected and interpreted, for example, to determine whether the cap P1 or the cap P2 is closed. The microcontroller MC1 interrupts at the instant the time-out and the corresponding cyclic detection, to then detect the value of level, by means of the sensor S2 or the sensor S6. Said final value is suitably stored, for example in the aforesaid third memory location (possibly there can also be stored, in a further location of the memory register in question, a temporal information which indicates the moment when the cap has been closed). It is evident that the difference between the values contained in the first memory location and in the third memory location express the amount of liquid supplied to or removed from the tank T1 or T2.

Preferably, when in the course of the time-out a reduction in level in the tank T1 and/or in the tank T2 is detected, the microcontroller generates and stores instantaneously, in a further location of the memory register, corresponding information aimed at expressing said anomaly, which evidently means a removal of fuel or of additive. This also enables detection of any fraudulent replacement of the contents of the tank: reference may be made, for example, to the case of introduction of fuel or of additive into the tank, immediately followed—for example, within a few seconds—by a subsequent partial replacement with other liquid of lower cost, in which case the level detected upon closing of the cap could also be the same as the one detected at the moment of opening of the cap: in any case said variations or anomalous conditions that have arisen between the steps of opening and closing of the cap would be stored, and hence detectable.

Upon a subsequent detection of movement of the cap P1 or P2, performed by means of the sensor S1' or S3', the unit CD will operate as has been seen above, storing the information in memory locations of a second memory register, and so forth.

The detections made by means of the quality sensor S4 are aimed basically at detecting any possible manipulation or alteration of the contents in the tank T2, such as dilution of the additive with other liquid, for example water. For this purpose the microcontroller MC1 can be, for example, programmed for acquiring cyclically (e.g., every hour) and/or at each opening of the cap P2 the data regarding the concentration of the solution contained in the tank T2, which are stored in respective locations of the memory MEM1, preferably to obtain a historic series of data over a reference period (for example, a day). Significant variations between the values of the series can be considered an index of manipulation or alteration of the contents of the tank T2. The same logic can evidently be applied also in the case of the quality sensor S5 associated to the fuel tank T1 (currently available are, for example, sensors designed to detect presence of water in the diesel fuel).

Hence, as may be readily appreciated, in the case of the embodiment referred to in FIG. 9, the unit CD will acquire also information regarding the quality of the contents of the tank T1 and/or information inherent the levels (supply or removal) of the contents of the tank T2.

Also the information of a "qualitative" type can be correlated to the information deduced by the other sensor means S2, S6 in order to identify any fraudulent conduct. For example, in the case of the tank T2 of FIG. 1, the microcontroller MC1 can be programmed for acquiring and storing, following upon opening of the cap P2, an "initial" datum, through the sensor S4, regarding the concentration of the solution present in the tank for the additive. Upon subsequent closing of the cap P2 a "final" concentration datum is then acquired and stored. It is evident that, in the case where the final concentration is decidedly lower than the initial one, there is a situation indicating a fraudulent dilution of the additive. Using the same logic, also a decay in the concentration which follows an increase in level of the contents of the tank T2 (detected by means of sensor means similar to the ones designated by S6 in FIG. 9) is highly indicative of a dilution of the additive. Obviously, approaches similar to the ones just referred to above for the tank 2 apply also for the tank T1, when this is provided with sensor means S5 of a qualitative type. Of course, also in these cases the data collected and stored are associated to respective temporal information.

The contents of the memory MEM1 is read periodically (for example, at the end of a working day, when the vehicle returns to depot, etc.) through the supervision unit RD (for example, a personal computer), provided with a microcontroller MC2, operatively connected to a data-communication interface RT2, with a communication technique and protocol compatible with those of the transceiver RT1 of the unit CD. For reading purposes, for example, the lorry is briefly made to stop in the vicinity of the aforesaid communication interface and, for example following upon a control issued manually through a keypad, the device RD sends, by means of the corresponding interface RT2, a query command to the unit CD.

The control unit CD receives, by means of the respective transceiver RT1, said query command and consequently transmits the contents of the memory MEM1 to the device RD, through which the corresponding information can be stored in a correlated form, in a respective nonvolatile memory MEM2, and/or made explicit in a correlated form, for example, on a display or by means of a printer, designated by OUT.

The control logic implemented can envisage that the entire contents of the memory MEM1 will be "downloaded" upon each query on the device AD or else enable specific requests for information to be made by means of the device RD (for example, a report limited to a day, two days, a week, or just information regarding the fuel, etc).

The microprocessor MC1 can conveniently be programmed, in a way in itself known, for erasing the contents of the memory MEM1 following upon an appropriate instruction transmitted by the unit RD. In this case, the nonvolatile memory means MEM1 will be of the read/write type (for example, of an EEPROM or Flash type).

In a possible embodiment, the values obtained by means of the various sensors and/or the contents of the memory MEM1 can be transmitted to a remote station, which constitutes the supervision unit RD, directly at the moment of detection and/or subsequent to detection, for example, by means of a system for transmission or communication in wireless mode, such as a radio-frequency transmission or a telephone communication or cellphone communication, for example in the form of messages, such as messages of the so-called SMS type.

From the foregoing description, the characteristics of the present invention emerge clearly, as likewise its advantages, principally represented by the possibility of preventing or discouraging fraudulent activities of removal and/or replacement of fuel and/or of an additive in a vehicle. The invention enables combination and/or processing and/or control and/or storage of the values of at least two or more detections or measurements, generated by two or more sensors associated to at least one tank of the vehicle, as well as association to said values of respective temporal information. The solution proposed proves constructionally simple and with a cost comparable to that of known solutions.

Of course, without prejudice to the principle of the invention, the details of construction and the embodiments may vary widely with respect to what is described and illustrated herein purely by way of example, without thereby departing from the scope as defined in the ensuing claims.

The type of the sensor means for detecting movement of the cap P1 and/or the cap P2 could be of a type different from the one exemplified. For example, the sensor means could be of an optical type, or else based upon sliding contacts, with modes of implementation appear clear to a person skilled in the art.

The cap P1 and/or the cap P2 can be indifferently with or without lock.

The means that allows the unit CD to make explicit the information contained in the respective memory means MEM could be represented by a communication port, for example, of a serial type, to which it is possible to connect a cable for connection to the unit RD.

The invention claimed is:

1. An antifraud device for a vehicle having a tank with a filler provided with a removable cap, the antifraud device being installed on the vehicle and comprising:
   first sensor means, configured for detecting a state condition of the cap, such as presence or absence of the cap in the filler and/or a displacement of the cap with respect to the filler;
   second sensor means, configured for detecting at least one of the level of the contents of the tank and a qualitative characteristic of the contents of the tank,
   a control unit, operatively connected to the first sensor means and to the second sensor means and configured for generating first information, being indicative of detections made by the first sensor means, and second information, being indicative of detections made by the second sensor means, the control unit being operatively connected to nonvolatile memory means and prearranged for storing in the memory means, in a correlated form, the first information and the second information;
   means for making explicit the first information and the second information in a correlated form, for the purposes of identification of one or more of the following conditions:
   fraudulent removal of at least part of the contents of the tank;
   fraudulent removal of at least part of the contents of the tank from an extraction point which is downstream of the filler;
   fraudulent dilution or alteration of the contents of the tank;
   fraudulent replacement of at least part of the contents of the tank;
   effective removal of the cap following upon movement thereof in the filler.

2. The device according to claim 1, wherein the means for making explicit the information comprise a circuit for transmission and reception of data in wireless mode.

3. The device according to claim 2, wherein the circuit for transmission and reception of data is a circuit for radiofrequency transmission and reception.

4. The device according to claim 1, wherein the first information comprises information of a temporal type, being indicative of date and/or time of the detections made by the first sensor means and/or by the second sensor means.

5. The device according to claim 4, wherein the control unit has a clock function and is prearranged for storing said temporal information following upon a detection made by the first sensor means.

6. The device according to claim 1, wherein the second sensor means comprise at least one of a level sensor and a sensor of said qualitative characteristic, preferably both a level sensor and a sensor of said qualitative characteristic.

7. The device according to claim 6, wherein the control unit is also pre-arranged for storing in the memory means, in a correlated form, information being indicative of detections made by said level sensor and information being indicative of detections made by said sensor of said qualitative characteristic.

8. The device according to claim 6, wherein the second sensor means comprise both a level sensor and a sensor of said qualitative characteristic.

9. The device according to claim 1, wherein the control unit is pre-arranged for storing information being indicative of the level and/or the qualitative characteristic of the contents of the tank following upon a detection made by the first sensor means.

10. The device according to claim 1, wherein the control unit is pre-arranged for storing information being indicative of a reduction in the level of the contents of the tank and/or information being indicative of a decay of said qualitative characteristic of the contents of the tank.

11. The device according to claim 1, wherein the control unit is pre-arranged for starting, following upon a detection made by the first sensor means, a step of cyclical acquisition of a value being indicative of the level or the qualitative characteristic of the contents of the tank, through the second sensor means.

12. The device according to claim 11, wherein the control unit is pre-arranged for storing, in the course of said step of cyclical acquisition, information being indicative of a reduction in the level or being indicative of a decay of the qualitative characteristic of the contents of the tank.

13. The device according to claim 1, wherein the control unit is also pre-arranged for receiving instructions from an external electronic device.

14. The device according to claim 1, wherein the control unit is pre-arranged for storing information being indicative of a significant reduction in the level of the contents of the tank and a subsequent significant increase of the level itself, or vice versa, which occur in a short period.

15. The device according to claim 14, wherein said short period is a period of a few seconds or minutes.

16. The device according to claim 1, wherein the control unit is pre-arranged for storing information being indicative of a significant variation in the level of the contents of the tank and a subsequent significant decay of the qualitative characteristic of the contents of the tank which occur in a short period.

17. The device according to claim 16, wherein said short period is a period of a few seconds or minutes.

18. The device according to claim 1, wherein the first sensor means are mounted at one of the cap and the filler, for detecting at least one of physical presence of the cap and a movement thereof with respect to the filler.

19. An antifraud method for a vehicle having a tank with a filler provided with a removable cap, the antifraud method comprising the operations of:
- a) detecting a condition of state of the cap, such as presence or absence of the cap in the filler and/or a displacement of the cap with respect to the filler, by means of first sensor means, and generating first information being indicative of detections made by means of the first sensor means;
- b) detecting at least one of the level of the contents of the tank and a qualitative characteristic of the contents of the tank, by means of second sensor means, and generating second information being indicative of detections made by means of the second sensor means;
- c) correlating the first information and the second information, in order to identify at least one of the following conditions:
  fraudulent removal of at least part of the contents of the tank;
  fraudulent removal of at least part of the contents of the tank from an extraction point being downstream of the filler;
  fraudulent dilution or alteration of the contents of the tank;
  fraudulent replacement of at least part of the contents of the tank;
  effective removal of the cap following upon movement in the filler.

20. The method according to claim 19, wherein, prior to operation c), the first information and the second information are stored in a correlated way.

* * * * *